(12) United States Patent
Stoller et al.

(10) Patent No.: US 9,835,736 B2
(45) Date of Patent: Dec. 5, 2017

(54) THERMALLY-PROTECTED SCINTILLATION DETECTOR

(71) Applicant: Schlumberger Technology Corporation, Sugar Land, TX (US)

(72) Inventors: Christian Stoller, Princeton Junction, NJ (US); Robert A. Adolph, Pennington, NJ (US); Bradley A. Roscoe, West Chesterfield, NH (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/643,988

(22) Filed: Mar. 10, 2015

(65) Prior Publication Data

US 2015/0185336 A1 Jul. 2, 2015

Related U.S. Application Data

(63) Continuation of application No. 12/573,194, filed on Oct. 5, 2009, now Pat. No. 8,987,670.

(60) Provisional application No. 61/160,734, filed on Mar. 17, 2009, provisional application No. 61/160,746, (Continued)

(51) Int. Cl.
| | | |
|---|---|---|
| *G01T 1/202* | (2006.01) | |
| *G01T 1/20* | (2006.01) | |
| *G01V 5/00* | (2006.01) | |
| *G01V 5/10* | (2006.01) | |

(52) U.S. Cl.
CPC ............... *G01T 1/202* (2013.01); *G01T 1/20* (2013.01); *G01V 5/00* (2013.01); *G01V 5/10* (2013.01)

(58) Field of Classification Search
CPC .. G01T 1/202; G01T 1/20; G01V 5/04; G01V 5/10
See application file for complete search history.

(56) References Cited

U.S. PATENT DOCUMENTS

| | | |
|---|---|---|
| 3,049,620 A | 8/1962 | George et al. |
| 3,105,148 A | 9/1963 | Monaghan et al. |
| 3,265,893 A | 8/1966 | Rabson et al. |

(Continued)

FOREIGN PATENT DOCUMENTS

| | | |
|---|---|---|
| BR | PI02905141 A2 | 3/2011 |
| EP | 0262524 A1 | 4/1988 |

(Continued)

OTHER PUBLICATIONS

Combined Search and Examination Report issue in United Kingdom Application No. 0917507.6 dated Jan. 25, 2010, 4 pages.
(Continued)

*Primary Examiner* — David Porta
*Assistant Examiner* — Mindy Vu
(74) *Attorney, Agent, or Firm* — Michael Dae

(57) ABSTRACT

Systems, methods, and devices for thermally protecting a scintillator crystal of a scintillation detector are provided. In one example, a thermally-protected scintillator may include a scintillator crystal and a thermal protection element, which may partially surround the scintillator crystal. The thermal protection element may be configured to prevent the scintillator crystal from experiencing a rate of change in temperature sufficient to cause cracking or non-uniform light output, or a combination thereof.

12 Claims, 8 Drawing Sheets

Related U.S. Application Data filed on Mar. 17, 2009, provisional application No. 61/104,115, filed on Oct. 9, 2008.

(56) References Cited

U.S. PATENT DOCUMENTS

| | | | |
|---|---|---|---|
| 3,496,360 A | | 2/1970 | Dewan |
| 4,245,479 A | * | 1/1981 | Richter, Jr. ............ F16L 53/00 250/261 |
| 4,517,459 A | | 5/1985 | Richter, Jr. et al. |
| 4,671,349 A | | 6/1987 | Wolk |
| 4,764,677 A | | 8/1988 | Spurney |
| 5,025,151 A | | 6/1991 | Melcher |
| 5,548,116 A | | 8/1996 | Pandelisev |
| 5,744,803 A | | 4/1998 | Grodsinsky et al. |
| 6,373,066 B1 | | 4/2002 | Penn |
| 6,403,962 B1 | | 6/2002 | Schmitt et al. |
| 7,067,815 B2 | | 6/2006 | Dorenbos et al. |
| 7,084,403 B2 | | 8/2006 | Srivastava et al. |
| 7,233,006 B2 | | 6/2007 | Dorenbos et al. |
| 7,999,220 B2 | | 8/2011 | Odom et al. |
| 2003/0043959 A1 | | 3/2003 | Wischmann et al. |
| 2003/0076914 A1 | | 4/2003 | Tiller et al. |
| 2006/0091312 A1 | | 5/2006 | Saenger |
| 2006/0237654 A1 | | 10/2006 | Srivastava et al. |
| 2007/0095543 A1 | * | 5/2007 | Tchakarov ............ E21B 47/011 166/380 |
| 2008/0164407 A1 | | 7/2008 | Choquette et al. |
| 2009/0108192 A1 | | 4/2009 | Groves |
| 2010/0090111 A1 | | 4/2010 | Stoller et al. |

FOREIGN PATENT DOCUMENTS

| | | |
|---|---|---|
| EP | 1081509 A3 | 3/2002 |
| EP | 1645891 A1 | 4/2006 |
| EP | 1873227 A2 | 1/2008 |
| FR | 2937148 A1 | 4/2010 |
| FR | 2945355 A1 | 11/2010 |
| GB | 2198448 A | 6/1988 |
| GB | 2464209 B | 3/2013 |
| GB | 2484029 B | 3/2013 |
| JP | 030239926 A | 10/1991 |
| WO | 01-96902 A2 | 12/2001 |

OTHER PUBLICATIONS

Combined Search and Examination Report issued in United Kingdom Application No. 1121996.1 dated Jan. 23, 2012, 6 pages.
Examination Report issued in United Kingdom Application No. 0917507.6 dated Jan. 23, 2012, 4 pages.
Examination Report issued in United Kingdom Application No. 0917507.6 dated May 31, 2011, 4 pages.
Examination Report issued in United Kingdom Application No. 0917507.6 dated Oct. 18, 2012, 4 pages.
Examination Report issued in United Kingdom Application No. 0917507.6 dated Nov. 30, 2012, 2 pages.
Examination Report issued in United Kingdom Application No. 1121996.1 dated Oct. 18, 2012, 3 pages.
Preliminary Search Report and Written Opinion issued in French Application No. 0957050 dated Aug. 27, 2014, 9 pages.
Preliminary Search Report and Written Opinion issued in French Application No. 1056865 dated Aug. 26, 2014, 7 pages.
Search Report and Examination Report of Gulf Cooperation Council Patent Application No. GCC/P/2009/14470 dated Oct. 19, 2012.
D. Ellis and J. Singer, Well Logging for Earth Scientists, Springer, 2007.
Examination Report issued in related GCC application GCC/P/2009/28433 dated Apr. 26, 2016, 5 pages.

* cited by examiner

THERMALLY-PROTECTED SCINTILLATION DETECTOR

RELATED APPLICATIONS

This application is a continuation of co-pending U.S. patent application Ser. No. 12/573,194, filed Oct. 5, 2009, which claims benefit of U.S. Provisional Application No. 61/104,115, filed on Oct. 9, 2008; U.S. Provisional Application No. 61/160,734, filed on Mar. 17, 2009; and U.S. Provisional Application No. 61/160,746, filed Mar. 17, 2009. Each of the aforementioned related patent applications is herein incorporated by reference.

BACKGROUND

The present disclosure relates generally to scintillation detectors and, more particularly, to thermal protection for scintillation detectors.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Scintillation detectors are employed in a variety of settings to detect nuclear and electromagnetic radiation. In the presence of such radiation, a scintillator crystal may produce detectable wavelengths of light. This light may be converted to an electrical signal by a light detection device, such as a photomultiplier tube, and the electrical signal may be subsequently analyzed to determine, for example, an amount of detected radiation. By way of example, scintillation detectors may assist in the indirect determination of formation lithology by detecting gamma-ray scattering in a subterranean formation, as well as the direct determination of the formation lithology by detecting neutron-induced gamma-rays caused by neutrons emitted into the subterranean formation.

When scintillation detectors are employed for downhole well-logging, the scintillator crystals of such scintillation detectors may be subjected to a rapid increase or decrease in temperature due to heat from the surrounding formation. Certain scintillation detectors, such as NaI(Tl) detectors, may operate correctly at temperatures up to 200° C. without any protection. Many new scintillation materials, such as $LaBr_3$:Ce and $LaCl_3$:C, among others, may function at temperatures even beyond 200° C. Many of the new scintillation materials, however, while capable of operating at a very high temperature, may tend to crack or shatter if heated or cooled too rapidly.

SUMMARY

Certain aspects commensurate in scope with the originally claimed embodiments are set forth below. It should be understood that these aspects are presented merely to provide the reader with a brief summary of certain forms the embodiments might take and that these aspects are not intended to limit the scope of the presently disclosed subject matter. Indeed, the embodiments may encompass a variety of aspects that may not be set forth below.

Embodiments of the present disclosure relate to systems, methods, and devices for thermally protecting a scintillator crystal of a scintillation detector. In one example, a thermally-protected scintillator may include a scintillator crystal and a thermal protection element, which may partially surround the scintillator crystal. The thermal protection element may be configured to prevent the scintillator crystal from experiencing a rate of change in temperature sufficient to cause cracking and/or non-uniform light output, or a combination thereof.

BRIEF DESCRIPTION OF THE DRAWINGS

Advantages of the presently disclosed subject matter may become apparent upon reading the following detailed description and upon reference to the drawings in which.

DETAILED DESCRIPTION

Figure 1:
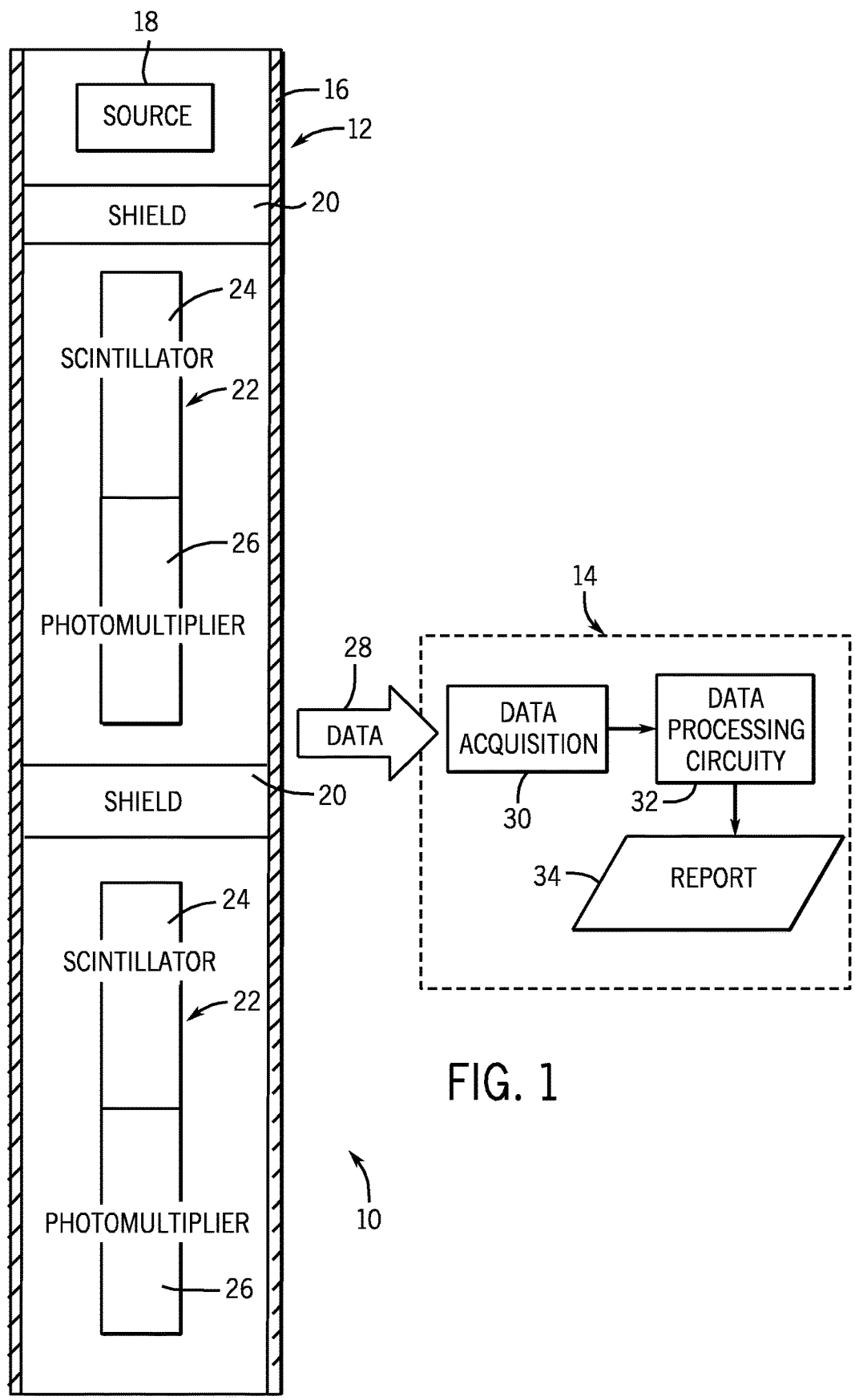
FIG. 1 is a schematic block diagram of a well logging system employing a thermally protected scintillation detector, in accordance with an embodiment.

One or more specific embodiments of the present disclosure will be described below. In an effort to provide a concise description of these embodiments, not all features of an actual implementation are described in the specification.

It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate generally to scintillation detectors for use in high-temperature environments (e.g., approximately 200° C. and above), which may include subterranean wells. Specifically, because entering and exiting such high-temperature environments may cause scintillator crystals capable of high-temperature operation to rapidly heat up and rapidly cool down, unprotected scintillator crystals may crack or break due to temperature stresses. Accordingly, various passive and active thermal-protection schemes for scintillator crystals are provided below. These thermal protection schemes may be simpler, smaller, and less expensive than traditional complete Dewar flasks, which may use a complex and mechanically fragile design and which typically may include a large thermal mass with a long stopper to allow extended use of the scintillation detector before exceeding its design temperature.

As described in the present disclosure, one or more thermal protection elements integrated into the package of the scintillator may reduce the rate of temperature change experienced by the scintillation detector, which may limit internal thermal stresses and may reduce the likelihood of scintillator damage caused by such stresses. Additionally or alternatively, embodiments of scintillator packages incorporating these thermal protection elements may provide an even temperature distribution in the scintillator crystal. This even temperature distribution may improve the spectroscopy performance of the scintillator crystal, as the light output of the scintillator crystal may be a function of the local temperature of the scintillator material. If the light output of the scintillator crystal is not uniform throughout, the energy resolution and associated spectroscopy performance may be impaired. In the following disclosure, the thermal protection elements may both reduce thermal stress and provide greater uniformity of light output by reducing thermal gradients in the scintillator crystal material.

In one example of a passive thermal protection element incorporated into a scintillator package, one or more thermal insulation layers may partially surround the scintillator crystal. These thermal insulation layers may reduce the rate of heat transfer to and from the scintillator crystal. Similarly, one or more thermally conductive layers may partially surround the scintillator crystal to provide for more even heating and cooling of the scintillator crystal. In another example, a partially-open Dewar flask may partially surround the scintillator crystal. These thermal protection elements may be extended beyond the scintillator component to partially surround a photomultiplier tube (PMT) component of the scintillation detector, which may further enhance the thermal protection of the scintillator crystal of the scintillation detector. In addition, certain embodiments of the partially-open Dewar flask may be modified to include magnetic shielding as well.

As noted above, a thermal protection element incorporated into a scintillator package may also actively prevent temperature stresses from harming the scintillator crystal. The active measures may include, for example, partially surrounding the scintillator crystal with a heating device. Prior to placing the scintillation detector into a high-temperature environment, the heating device may heat the scintillator crystal such that the rate of temperature change does not exceed a threshold amount (e.g., 2° C. per minute). Similarly, when the scintillation detector is removed from the high-temperature environment, the heating device may occasionally heat the scintillator crystal as the crystal cools to prevent the temperature from changing at a rate that would exceed the threshold amount. In this way, temperature stresses from rapid temperature change may be actively averted. These active measures may be combined with the passive measures discussed above.

With the foregoing in mind, FIG. 1 represents an embodiment of a well-logging system 10 employing a thermally-protected scintillation detector. As illustrated in FIG. 1, the well-logging system 10 may include a downhole tool 12 and data processing circuitry 14. By way of example, the downhole tool 12 may be a slickline or wireline tool for logging an existing well, or may be installed in a borehole assembly for logging while drilling (LWD). The data processing system 14 may be incorporated into the downhole tool 12 or may be at a remote location. The downhole tool 12 may include an external housing 16 that includes a variety of well-logging components.

In some embodiments, a radiation source 18 may be employed to emit radiation into a surrounding formation, which may emit such radiation as neutrons, gamma rays, and/or other particles or electromagnetic radiation. By way of example, the radiation source 18 may be an electronic neutron source, such as a Minitron™ by Schlumberger Technology Corporation by Schlumberger Technology Corporation. In other embodiments, the downhole tool 12 may not include the radiation source 18.

If a radiation source 18 is employed, a shield 20 may prevent errant radiation from traveling directly to a thermally-protected scintillation detector 22. The scintillation detector 22 may include a scintillator component 24 and a photomultiplier tube component 26. A scintillator crystal in the scintillator component 24 may generate light in the presence of certain radiation (e.g., x-rays or gamma-rays), which may occur spontaneously in the surrounding formation or when radiation from the radiation source 18 interacts with the surrounding formation. The photomultiplier tube component 26 may generate an electrical signal from the light generated by the scintillator crystal in the scintillator component 24. As described below, a package encompassing the scintillator component 24 may incorporate passive and/or active thermal protection elements for the scintillator crystal of the scintillator component 24 that partially surround the scintillator crystal. In some embodiments, the thermal protection element and/or the package for the scintillator crystal of the scintillator component 24 may extend over all or a portion of the photomultiplier tube component 26.

As discussed below, the scintillator component 24 may include a high-temperature scintillator crystal. Such a high-temperature scintillator crystal may be hygroscopic or non-hygroscopic. Examples of hygroscopic high-temperature scintillator crystals may include scintillator crystals of $LaBr_3$:Ce and/or $LaCl_3$:C available from Saint-Gobain, as well as scintillator crystals of mixed La-halides available from General Electric Company. Various oxide-based scintillator crystals with excellent high temperature performance may also be used, many of which are non-hygroscopic.

These may include, for example, LuAP:Ce, LuYAP:Ce, YAP:Ce, LuAG:Pr, and LPS (Lutetium Pyro-Silicate, $Lu_2Si_2O_7$), to name a few.

The high-temperature scintillator crystals mentioned above may be capable of operating at temperatures much greater than 200° C. However, these scintillator crystals may crack or break if subjected to rapid temperature changes. Thus, as described in greater detail below, the thermally-protected scintillation detectors 24 may include passive and/or active measures to prevent such rapid temperature changes. The passive measures may include thermal insulation or a partially-open Dewar flask to reduce heat transfer from the surrounding formation into the scintillator crystal. The active measures may include controlling the rate of temperature increase of the scintillator crystal by heating the scintillator crystal before and after the scintillator detector enters a high-temperature environment.

Signals from the thermally-protected scintillation detectors 22 may be transmitted to the data processing system 14 as data 28. The data processing system 14 may include a general-purpose computer, such as a personal computer, configured to run a variety of software, including software implementing a technique for determining formation properties based on radiation detected by the scintillation detectors 22. In some embodiments, the data processing system 14 may be an embedded processor in the downhole tool 12.

The downhole tool 12 may transmit the data 28 to the data acquisition circuitry 30 of the data processing system 14 via, for example, a telemetry system communication downlink or a communication cable. After receiving the data 28, the data acquisition circuitry 30 may transmit the data 28 to data processing circuitry 32. In accordance with one or more stored routines, the data processing circuitry 32 may process the data 28 to ascertain one or more properties of a subterranean formation surrounding the downhole tool 12, which may be indicated by a report 34. The data processing circuitry 32 may employ any suitable technique for determining the properties of the subterranean formation.

Figure 2:
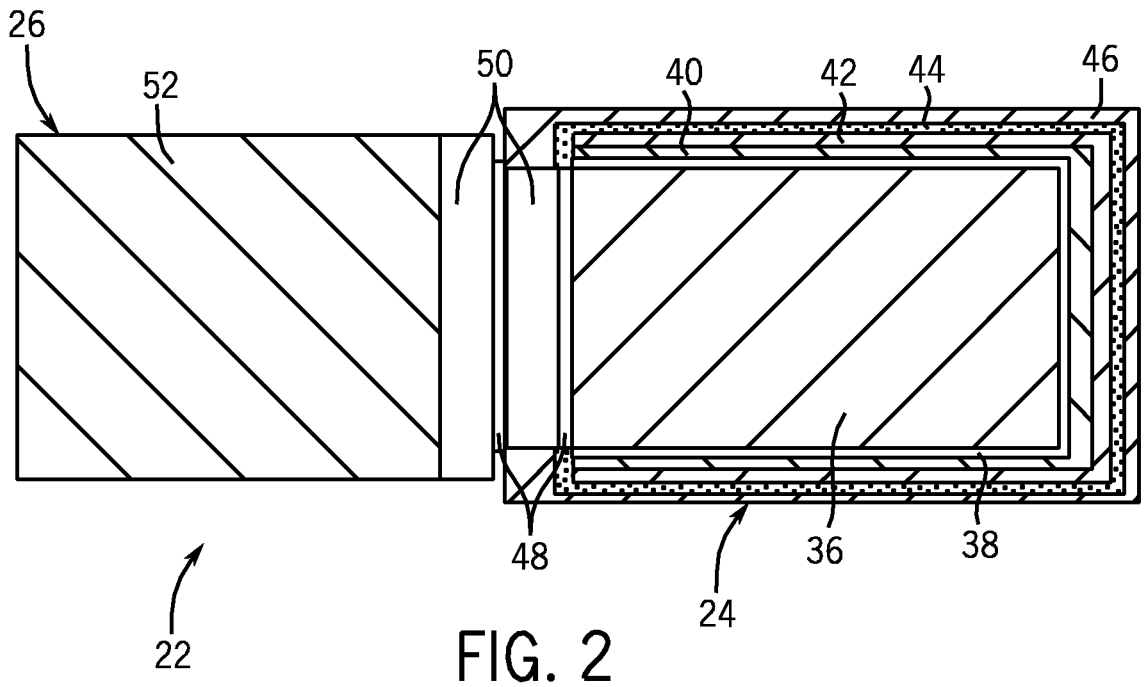
FIG. 2 is a schematic cross-sectional view of a thermally-protected scintillation detector employing a hygroscopic scintillator crystal, in accordance with an embodiment.
Figure 5:
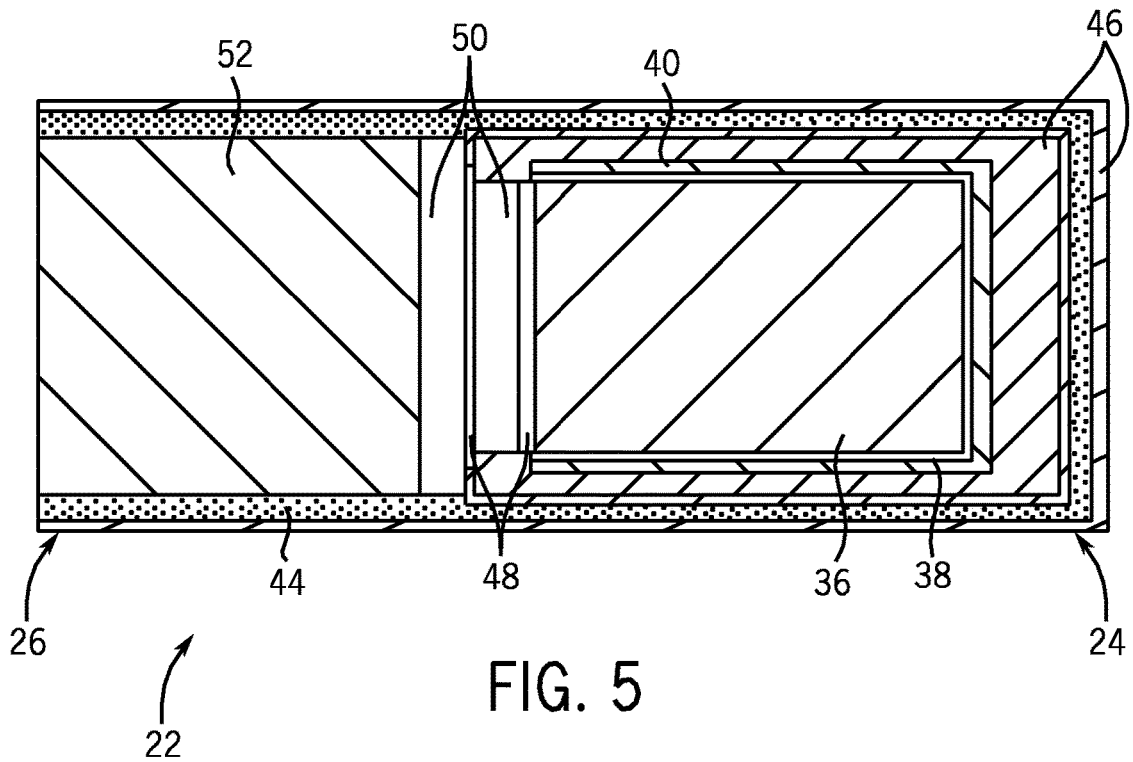
FIG. 5 is a schematic cross-sectional view of a thermally-protected scintillation detector having a thermal protection element extending over a photomultiplier tube, in accordance with an embodiment.
Figure 6:
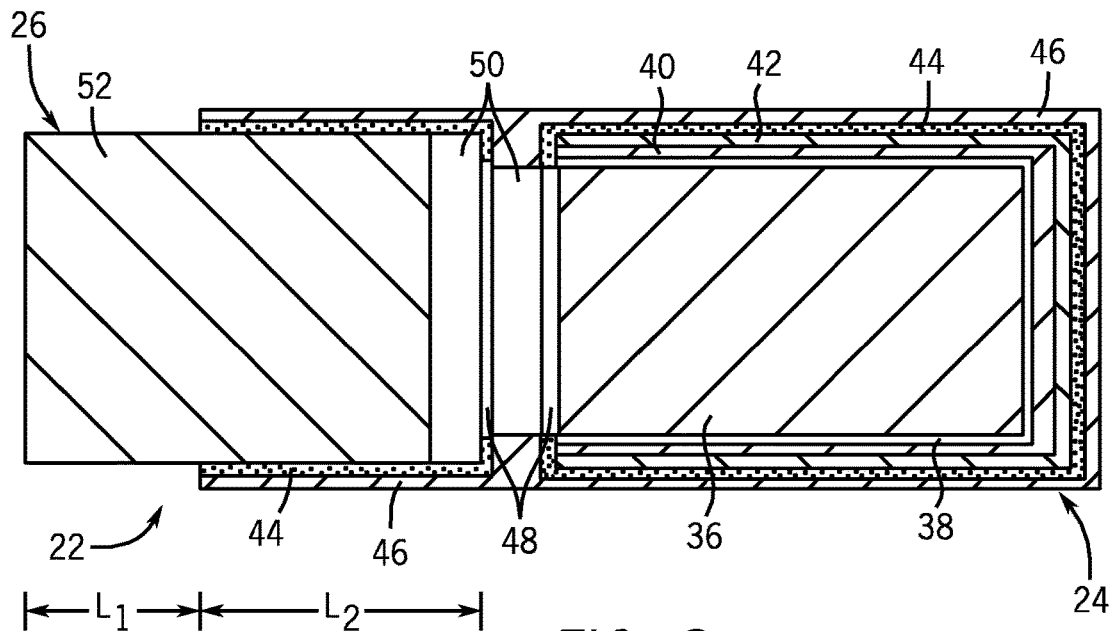
FIG. 6 is a schematic cross-sectional view of a thermally-protected scintillation detector having a thermal protection element partially extending over a photomultiplier tube, in accordance with an embodiment.
Figure 7:
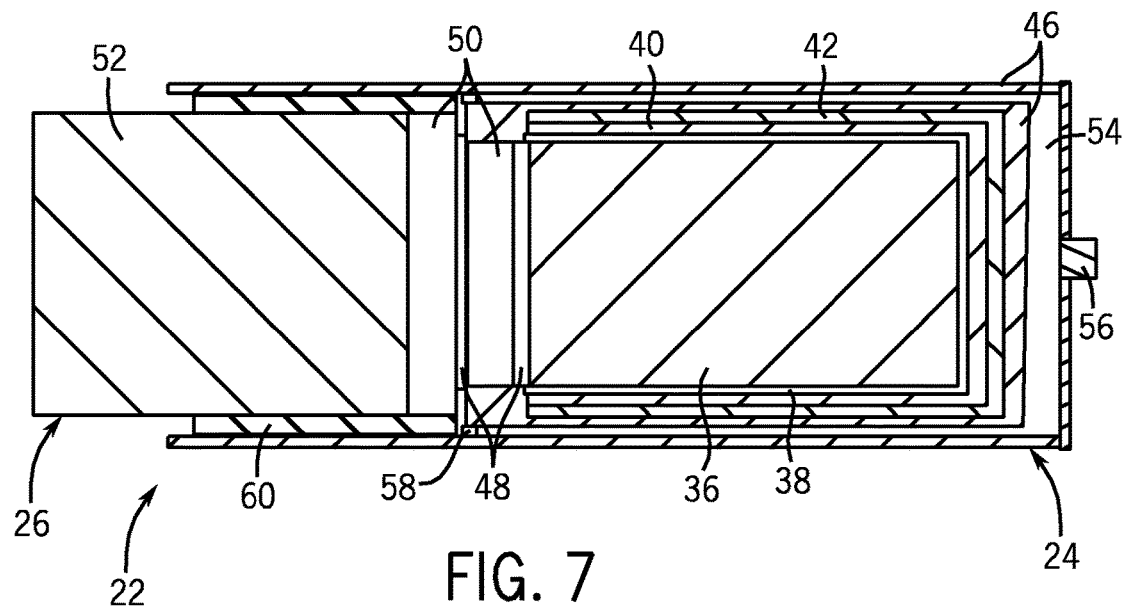
FIG. 7 is a schematic cross-sectional view of a thermally-protected scintillation detector employing a partially-open Dewar flask integrated with a housing of a scintillator crystal, in accordance with an embodiment.
Figure 8:
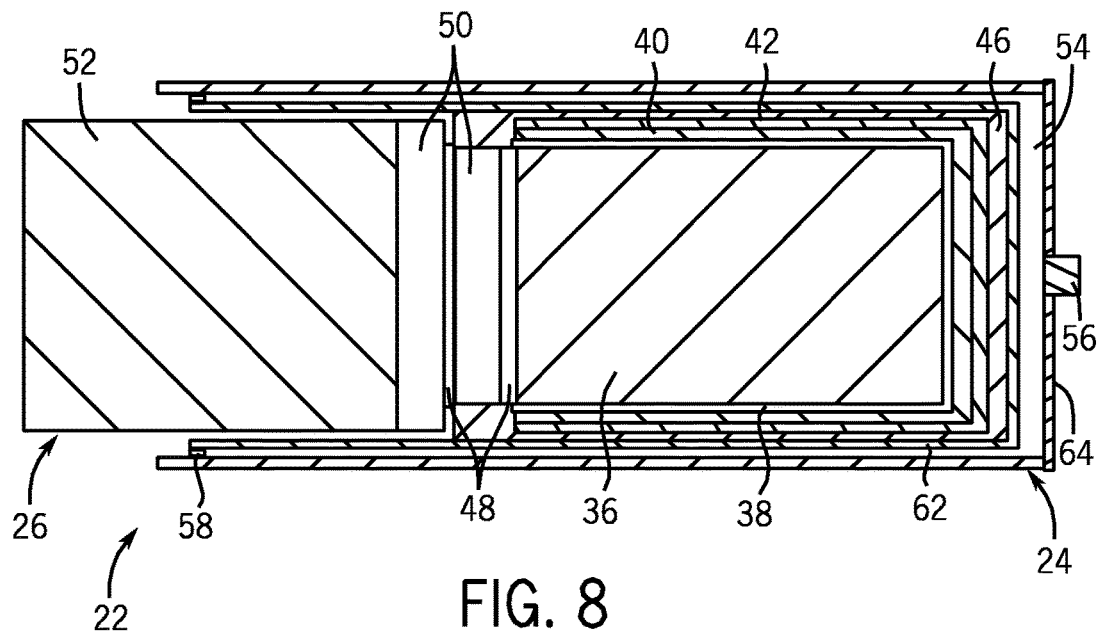
FIG. 8 is a schematic cross-sectional view of a thermally-protected scintillation detector employing an extended partially-open Dewar flask with magnetic shielding, in accordance with an embodiment.
Figure 9:
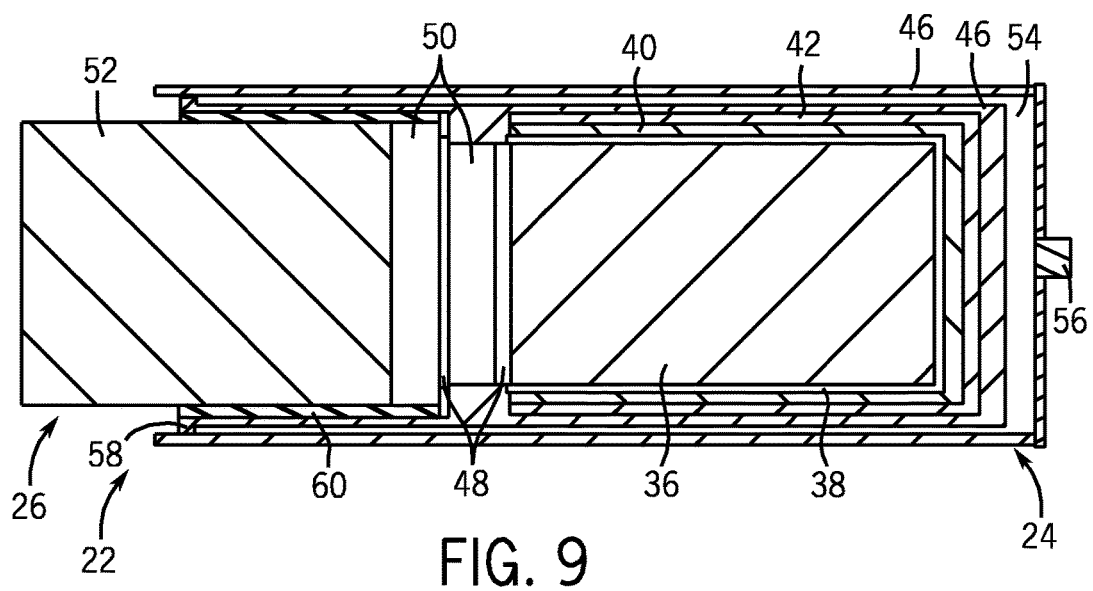
FIG. 9 is a schematic cross-sectional view of a thermally-protected scintillation detector employing an extended partially-open Dewar flask integrated with a housing of a scintillator crystal, in accordance with an embodiment.

FIGS. 2-9 represent embodiments of the scintillation detectors 22 incorporating passive measures to protect high-temperature scintillator crystals. Specifically, FIGS. 2-6 represent embodiments employing thermal insulation and FIGS. 7-9 represent embodiments employing a partially-open Dewar flask, which can also be considered thermal insulation, but due to its characteristics, may impart certain additional benefits. Turning first to FIG. 2, the thermally-protected scintillation detector 22 may include the scintillator component 24 and the photomultiplier component 26. The scintillator component 24 may include a scintillator crystal 36, a reflector layer 38, a shock absorber layer 40, a thermal conductor layer 42, a thermal insulation layer 44, and a scintillator housing 46. In general, the various layers surrounding or partially surrounding the scintillator crystal 36 may form the "package" which encapsulates or partially encapsulates the scintillator crystal 36. In the embodiment of FIG. 2, the scintillator crystal 36 may be hermetically sealed behind an optical coupling 48 and a window 50 to prevent moisture from damaging the scintillator crystal 36. As such, the scintillator crystal 36 may be a hygroscopic or non-hygroscopic scintillator crystal capable of operating under high temperatures. Such scintillator crystals may include, for example, $LaBr_3$:Ce or $LaCl_3$:Ce scintillator crystals available from Saint-Gobain, scintillator crystals of mixed La-halides available from General Electric Company, and/or oxide-based scintillator crystals with excellent high temperature performance such as LuAP:Ce, LuYAP:Ce, YAP:Ce, LuAG:Pr, and LPS (Lutetium Pyro-Silicate, $Lu_2Si_2O_7$).

The reflector layer 38 may surround the scintillator crystal 36 to reflect light generated by the scintillator crystal 36 toward the photomultiplier component 26. The reflector layer 38 may include, for example, Teflon®, $Al_2O_3$ or $TiO_2$, or other materials in the form of sheets, cast shapes, powders or paint. The next layer surrounding the reflective layer 38 may be the shock absorber layer 40. The shock absorber layer 40 may be capable of contracting or expanding to accommodate differential thermal expansion and/or contraction of the scintillator crystal 36. The shock absorber material 40 may be a solid material like a high temperature elastomer (e.g. Viton or a Silicone based Elastomer) and/or may include radial or axial springs. The elastomer may include ribs or other features to provide room for its thermal expansion or contraction while providing mechanical support to the scintillator 36.

The thermal conductor layer 42 and the thermal insulation layer 44 may operate in concert to reduce the rate of temperature change in any particular location of the scintillator crystal 36. In particular, the thermal insulation layer 44 may reduce the rate at which heat is transferred between the scintillator housing 46 and the remaining layers between the scintillator housing 46 and the thermal conductor 42. The thermal insulation layer 44 may include, for example, various elastomers and similar materials (e.g., a viton sheet or silicone), fiberglass, an aerogel, plastics (e.g., peek), Teflon® materials such as perfluoroalkoxy polymer resin (PFA), polytetrafluoroethylene (PTFE), or fluorinated ethylene propylene (FEP), and/or a polyimide film such as Kapton®. As illustrated in FIG. 2, the thermal insulation layer may partially surround the scintillator crystal 36, leaving an opening for the optical coupling 48 and window 50. The thermal conductor layer 42 may distribute any heat transferred through the thermal insulation layer 44 evenly across the surface of the scintillator 36. In certain embodiments, the thermal conductor layer 42 may cover greater scintillator crystal 36 surface by extending into the center of the scintillator crystal 36 via a hole drilled in the scintillator 36. The thermal conductor layer 42 may include any thermally-conductive material, such as aluminum, copper, or stainless-steel.

The scintillator housing 46 may represent any standard housing for a scintillator crystal. In some embodiments, an additional thermal conductor layer may surround all or part of the scintillator housing 46 to insure heat is evenly distributed across the surface area of the scintillator housing 46. Since the scintillator crystal 36 may be a hygroscopic scintillator crystal, the scintillator housing 46 may be constructed to seal the scintillator crystal 36 from external moisture. As such, an optical coupling 48 may join the scintillator crystal 36 to an optical window 50 attached to the scintillator housing 46.

The photomultiplier component 26 may similarly include an optical coupling 48 and a window 50 to connect to the scintillator component 24. The photomultiplier component may include a photomultiplier tube 52, which may not necessarily include thermal protection, as many available photomultiplier tubes 52 may be capable of operating under rapidly varying temperatures. In alternative embodiments, the photomultiplier component 26 may include a microchannel plate (MCP) in lieu of the standard multiplier structure or the photomultiplier component 26 may be an avalanche photodiode (APD). Additionally, while the photomultiplier component 26 is illustrated as optically coupled to the scintillator component 24, which is hermetically sealed to protect the scintillator crystal 36, it also may be possible to mount the scintillator crystal 36 directly to the photomultiplier tube 52, if both are encased in a single hermetically sealed package.

Figure 3:
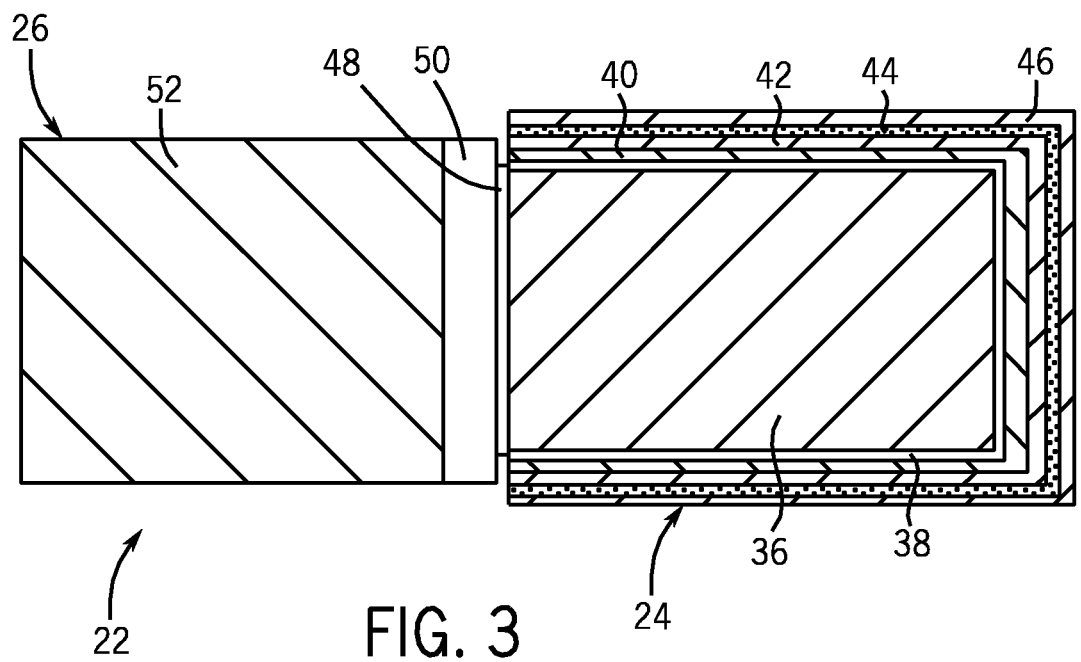
FIG. 3 is a schematic cross-sectional view of a thermally-protected scintillation detector employing a non-hygroscopic scintillator crystal, in accordance with an embodiment.

FIG. 3 represents an alternative embodiment of the scintillation detector 22 illustrated in FIG. 2. The embodiment of the scintillation detector 22 of FIG. 3 is substantially the same as that of FIG. 2, including the scintillator component 24 and the photomultiplier component 26. The scintillator component 24 may similarly include the scintillator crystal 36, the reflector layer 38, the shock absorber layer 40, the thermal conductor layer 42, the thermal insulation layer 44, and the scintillator housing 46. However, the scintillation crystal 36 may be a non-hygroscopic scintillation crystal, such as an oxide-based scintillator crystal with high temperature capabilities, such as LuAP:Ce, LuYAP:Ce, YAP:Ce, LuAG:Pr, or LPS (Lutetium Pyro-Silicate, $Lu_2Si_2O_7$). Because the scintillator crystal 36 is non-hygroscopic, the thermal protection elements need not be sealed within in the scintillator housing 46. As such, the optical coupling 48 and window 50 may be omitted from the scintillator component 24. Like the embodiment discussed above, the optical coupling 48 and the optical window 50 of the photomultiplier component 26 may optically couple the scintillator crystal 36 to the photomultiplier tube 52.

Figure 4:
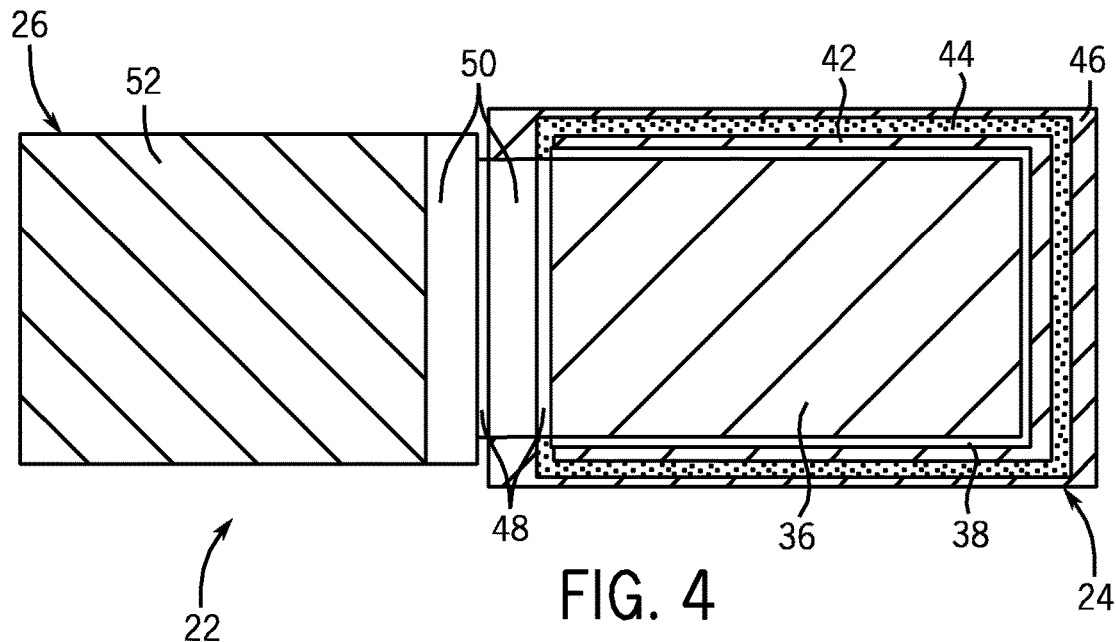
FIG. 4 is a schematic cross-sectional view of a thermally-protected scintillation detector in which a shock absorption layer and thermally conductive layer are combined, in accordance with an embodiment.

FIG. 4 represents another embodiment of the scintillation detector 22, in which the shock absorbing layer 40 may be combined into the thermal insulation layer 44. Like the embodiment of the scintillation detector 24 of FIG. 2, the embodiment of the scintillation detector 22 of FIG. 4 may include the scintillator component 24 and the photomultiplier component 26. The scintillator component 24 may similarly include the scintillator crystal 36, the reflector layer 38, the thermal conductor layer 42, the thermal insulation layer 44, and the scintillator housing 46. Like the embodiments discussed above, the optical couplings 48 and the optical windows 50 may optically couple the scintillator crystal 36 to the photomultiplier tube 52. However, the thermal insulation layer 44 may be designed to incorporate the shock absorbing characteristics associated with the shock absorbing layer 40 of the embodiments of FIGS. 2 and 3 above. The material could be a high temperature elastomer (e.g. Viton or a high temperature Silicone elastomer). In some embodiments, when the reflector layer 38 employs a metallic reflector, such as silver, the reflector layer 38 may also be combined into the thermal conductor layer 42.

It should be noted that, in some embodiments, the thermal conductor layer 42 may be eliminated entirely if the thermal protection provided by the thermal insulation layer 44 is sufficient. In other words, if the thermal conductivity of the scintillator crystal 36 material and the reduced rate of temperature increase provided by the thermal insulation layer 44 are sufficient to protect the scintillator crystal 36 from excessive thermal stress, the thermal conductor layer 42 may also be omitted.

For certain applications of the downhole tool 12, such as traversing a zone of steam flood during well logging, the temperature of the surrounding environment may increase very rapidly. Under such extreme conditions, the thermal protection measures discussed above may not sufficiently protect all elements of the scintillation detector 22. To protect the photomultiplier tube 52 from these high temperatures, as well as to prevent the transfer of heat through the window 50 via the photomultiplier tube 52, the thermal protection measures described above may be adapted. In particular, these adaptations may take two forms, including mounting the entire scintillation detector 22 inside a thermally protective housing and expanding the thermal protections described above to cover all or part of the photomultiplier tube 52. In the first case, the thermal protection measures may not be integrated into the housing of the scintillator component 24, but the outer diameter of the scintillation detector 22 may be expanded. To maintain the same diameter, the size of the scintillator crystal 36 may be reduced. The second case, in which the thermally protective elements have been expanded to cover all or part of the photomultiplier tube 52, is illustrated in FIG. 5. In general, the thermal protection may not extend over any heat-generating elements, such as resistors, diodes or active electronic components that may be mounted on the photomultiplier tube 52 to provide the correct operating voltage or to amplify the signals available at the output of the photomultiplier. In addition, extending the thermal protection beyond the photomultiplier window helps insure a more uniform temperature distribution on the photocathode and thereby a better spectroscopy performance.

The embodiment of the scintillation detector 22 of FIG. 5 may include the scintillator component 24 and the photomultiplier component 26. The scintillator component 24 may include the scintillator crystal 36, the reflector layer 38, the shock absorbing layer 40, the thermal conductor layer 42, the thermal insulation layer 44, and the scintillator housing 46. Like the embodiments discussed above, the optical couplings 48 and the optical windows 50 may optically couple the scintillator crystal 36 to the photomultiplier tube 52. In the embodiment of FIG. 5, however, the thermal insulation layer 44 and the thermal conductor layer 42 may extend over the photomultiplier tube 52, surrounded by an outer housing 46. This may reduce the amount of heat that may reach the scintillator crystal 36 via the photomultiplier tube 52. The thermal conductor layer 42 should not extend over the photomultiplier tube 52 to prevent excessive heat from reaching the scintillator crystal 36 through the thermal conductor layer 42.

As shown in FIG. 6, the thermal insulation layer 44 may extend only as far as may optimally provide a reduction in heat transfer to the scintillation crystal 36 from an external high-temperature environment. In FIG. 6, the scintillator component 24 of the scintillation detector 22 may include the scintillator crystal 36, the reflector layer 38, the shock absorbing layer 40, the thermal conductor layer 42, the thermal insulation layer 44, and the scintillator housing 46. Like the embodiments discussed above, the optical couplings 48 and the optical windows 50 may optically couple the scintillator crystal 36 to the photomultiplier tube 52 of the photomultiplier component 26.

Unlike the embodiments described above, the embodiment of the scintillation detector 22 of FIG. 6 may include partial thermal protection over the photomultiplier tube 52. The non-thermally protected length of the photomultiplier tube 52 is denoted as $L_1$, while the thermally-protected length is denoted as $L_2$. Extending the length $L_2$ beyond a certain distance may provide diminishing thermal protection for the scintillator crystal 36, but may add additional manufacturing costs, weight, and size to the scintillation detector 22. Accordingly, optimal distances $L_1$ and $L_2$ may be determined by modeling the reduction in heat transfer to the scintillator crystal 36 at various values of $L_1$ and/or $L_2$.

FIGS. 7-9 represent embodiments of the thermally-protected scintillation detector 22 employing a partially-open Dewar flask to obtain thermal protection from rapid heating and cooling. In the embodiment of FIG. 7, the scintillation detector 22 may include the scintillator component 24 and the photomultiplier component 26. The scintillator component 24 may include the scintillator crystal 36, the reflector layer 38, the shock absorber layer 40, the thermal conductor layer 42, and the scintillator housing 46. Like the embodiments discussed above, the optical couplings 48 and the optical windows 50 may optically couple the scintillator crystal 36 to the photomultiplier tube 52. The scintillator housing 46 may be constructed to form a partially-open Dewar flask that causes a vacuum 54 to separate the two housing layers 46. Following construction of the partially-open Dewar flask, the two housing layers 46 may include a pinch-off 56 and weld 58. It should be understood that certain details regarding the construction of the partially-open Dewar flask, such as internal supports, thermal radiation reflectors, and so forth, are not shown, as they are well known in the art.

Like the embodiments discussed above, certain thermally-protective elements may extend to cover all or part of the photomultiplier tube 52, which may also serve to thermally protect the scintillator crystal 36 in a manner similar to a stopper in a traditional Dewar flask. In the embodiment illustrated in FIG. 7, a layer of electrical and/or thermal insulation 60 may shield a portion of the photomultiplier tube 52 beneath the outer layer of the scintillator housing 46. The precise distance over which the layer 60 and scintillator housing 46 may extend may be determined through thermal and/or electrical modeling. The layer 60 may cover few, if any, heat-generating components of the photomultipler tube 52, such as resistors, diodes, or active electronic components that may be mounted on the photomultiplier tube 52.

FIG. 8 illustrates an alternative embodiment of the scintillation detector 22 illustrated in FIG. 7, in which the partially-open Dewar flask may be completely separate from the scintillator housing 46. In the embodiment of FIG. 8, the scintillation detector 22 may include the scintillator component 24 and the photomultiplier component 26. The scintillator component 24 may include the scintillator crystal 36, the reflector layer 38, the shock absorber layer 40, the thermal conductor layer 42, and the scintillator housing 46. Like the embodiments discussed above, the optical couplings 48 and the optical windows 50 may optically couple the scintillator crystal 36 to the photomultiplier tube 52. The partially-open Dewar flask may be formed by an inner wall 62 and an outer wall 64 joined by a weld 58, and the space between may be evacuated to produce an insulative vacuum 54. Like the embodiment of FIG. 7, a pinch-off 56 may be used in forming the partially-open Dewar flask. In some embodiments, it may not be practical or desirable to extend the partially-open Dewar flask over the photomultiplier tube 52. Under such conditions, the inner wall 62 and outer wall 64 may be shortened to approximately the length of the partially-open Dewar flask of FIG. 7. The partially-open Dewar flask may cover few, if any, heat-generating components of the photomultipler tube 52, such as resistors, diodes, or active electronic components that may be mounted on the photomultiplier tube 52.

Because the partially-open Dewar flask is constructed in such a way as to overlap the front end of the photomultiplier tube 52, thermal leakage from the photomultiplier 52 may be reduced, which may assure a more uniform scintillator crystal 36 temperature. Indeed, the photomultiplier 52 may effectively thermally protect the scintillator crystal 36 in a manner similar to a stopper in a traditional Dewar flask. Additionally, the shape of the partially-open Dewar flask may also result in a uniform temperature of a photocathode of the photomultiplier tube 52. A non-uniform photocathode temperature may lead to a non-uniform special distribution of the quantum efficiency (QE) of the photomultiplier tube 52 and, as a consequence, may lead to poorer spectroscopy performance.

Using the embodiment of FIG. 8, the thermal protection function provided by the partially-open Dewar flask may be combined with a magnetic shielding function. Specifically, the materials of the inner wall 62 and the outer wall 64 of the partially-open Dewar flask may be chosen to magnetically shield the photomultiplier tube 52. For example, the inner wall 62, the outer wall 64, or both the inner wall 62 and the outer wall 64 may be constructed of materials with high magnetic permeability. Additionally or alternatively, the inner wall 62 may have a layer of a material with a very high permeability and a relatively low saturation (e.g., Admu 80 from AD-Vance Magnetics), and the outer wall 64 may be constructed of or may have a layer of a material with a lower permeability and higher saturation (e.g., soft iron).

FIG. 9 illustrates another alternative embodiment of the scintillation detector 22 of FIG. 7, in which the partially-open Dewar flask may be formed in the scintillator housing 46, but which may extend to cover all or part of the photomultiplier tube 52. In the embodiment of FIG. 9, the scintillation detector 22 may include the scintillator component 24 and the photomultiplier component 26. The scintillator component 24 may include the scintillator crystal 36, the reflector layer 38, the shock absorber layer 40, the thermal conductor layer 42, and the scintillator housing 46. Like the embodiments discussed above, the optical couplings 48 and the optical windows 50 may optically couple the scintillator crystal 36 to the photomultiplier tube 52. The two scintillator housing layers 46 may extend to cover all or part of the photomultiplier tube 52, between which a partially-open Dewar flask may be formed. As such, the scintillation detector 22 may also include the weld 58 and the pinch-off 56. Some embodiments may also include the layer of electrical and/or thermal insulation 60. To effectively thermally insulate the scintillator crystal 36, the layer 60 may cover few, if any, heat-generating components of the photomultiplier tube 52, such as resistors, diodes, or active electronic components that may be mounted on the photomultiplier tube 52.

The scintillator housing 46 and optical windows 50 in the embodiments of FIGS. 7-9 are illustrated as hermetically sealing the scintillator crystal 36. However, if the scintillator crystal 36 is non-hygroscopic, the scintillator crystal 36 may alternatively couple directly to the window 50 of the photomultiplier tube 52, as generally illustrated above with reference to FIG. 3. Moreover, even if the scintillator crystal 36 is hygroscopic, the scintillator crystal 36 may couple directly to the window 50 of the photomultiplier tube 52 if the photomultiplier tube 52 is hermetically sealed with the scintillator crystal 36.

Figure 10:
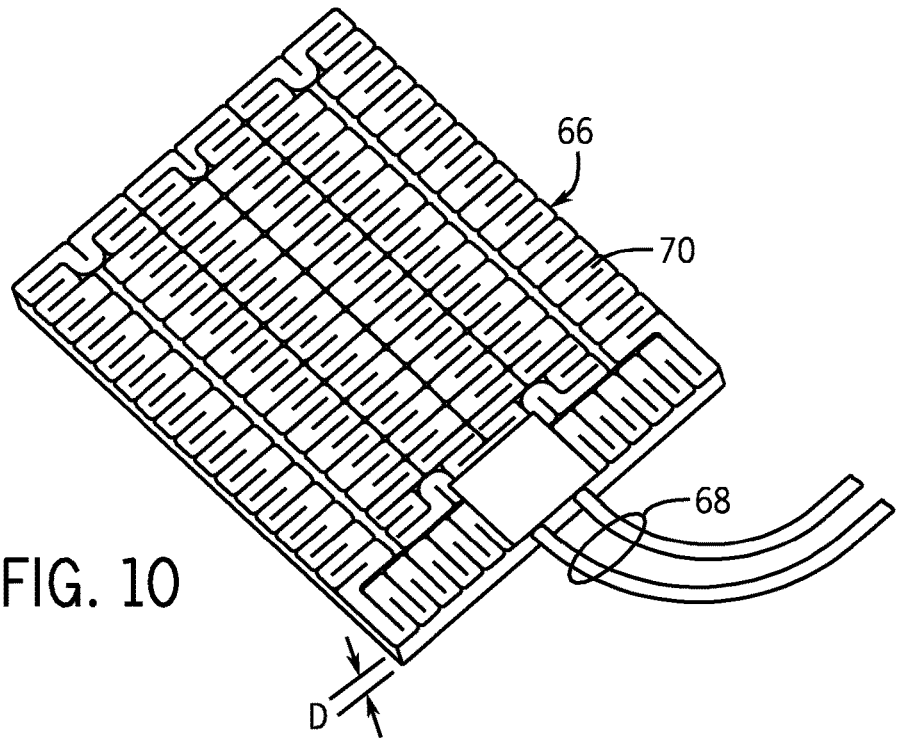
FIG. 10 is a perspective view of a high temperature heater layer integrated into a thermally-protected scintillation detector, in accordance with an embodiment.

FIGS. 10-13 describe a manner of actively providing thermal protection for the scintillator crystal 36 of the thermally-protected scintillation detector 22. Because certain scintillator crystals (e.g., $LaBr_3$) may crack or break if the rate of temperature change exceeds a threshold rate of change (e.g., 2° C. per minute), FIG. 10 illustrates a heating device 66 that may be used to prevent the scintillator crystal 36 from heating or cooling too quickly. Specifically, the heating device 66 may preheat the scintillator crystal 36 before the scintillator crystal 36 enters a high-temperature environment to prevent excessive temperature increases, and may occasionally provide heat after the scintillator crystal 36 exits the high-temperature environment to prevent excessive temperature decreases. The heating device 66 may be, for example, a polyimide heater pad or sleeve, such as the Kapton® heater by Hi-Heat Industries.

As illustrated in FIG. 10, the heating device 66 may receive electrical power via electrical leads 68. The electrical power may travel through a resistive path 70 to generate heat. In some embodiments, the heating device 66 may be a flexible film etched onto a metal foil, such as polyimide. Such a heating device 66 may withstand extreme temperature ranges, including high temperatures (e.g., 200° C. or greater). The heating device 66 may have rapid warm-up times and a quick response, as the resistive path 70 may run cooler. As such, the heating device 66 may thus be ideal for service in harsh environments such as subterranean formations.

The heating device 66 may be relatively thin, having a thickness D of approximately 0.005 inches, and may include a control circuit, as well as temperature sensors and other conventional devices for heaters. Using the temperature sensors, the control circuit may carry out such algorithms as described below with reference to FIGS. 12 and 13 for warming and cooling a scintillator crystal 36 to prevent excessive temperature change. Additionally or alternatively, the data processing system 14 may control the heating device 66, in which case the data processing system 14 may carry out these algorithms. It should be noted that the heating device 66 may have significant power density; in one embodiment, the heating device 66 may have a density of 5 watts per square inch, at 120V.

To heat the scintillator crystal 36 of the scintillation detector 22, the heating device 66 may be mounted to a portion of the outer housing 46 or installed internally to the housing 46. Generally, if the heating device 66 is mounted to the outer housing 46, other thermal protection should not be employed by the scintillation detector 22. Additionally or alternatively, the heating device 66 may be disposed internally to a scintillation detector 22 that employs passive thermal protection measures. One such configuration is illustrated in FIG. 11.

Figure 11:
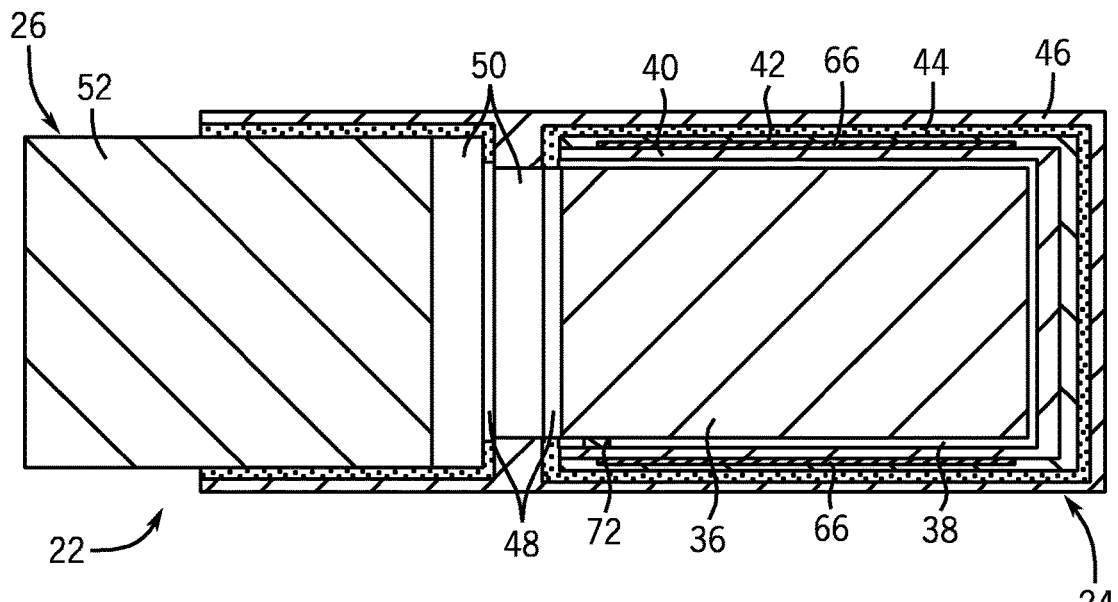
FIG. 11 is a schematic cross-sectional view of a scintillation detector employing the heater of FIG. 10, in accordance with an embodiment.

FIG. 11 represents one embodiment of the thermally-protected scintillation detector 22 that employs the heating device 66, with certain control algorithms, to prevent rapid heating and/or cooling of the scintillator crystal 36. Although the scintillation detector 22 of FIG. 11 is illustrated as including passive measures (e.g., the thermal insulation layer 44 and/or the thermal conductor layer 42), the heating device 66 may be employed with or without such passive thermal protection. In the embodiment of FIG. 11, the scintillation detector 22 may include the scintillator component 24 and the photomultiplier component 26. The scintillator component 24 may include the scintillator crystal 36, the reflector layer 38, the shock absorber layer 40, the thermal conductor layer 42, the thermal insulation layer 44, and the scintillator housing 46. Like the embodiments discussed above, the optical couplings 48 and the optical windows 50 may optically couple the scintillator crystal 36 to the photomultiplier tube 52.

Thermally coupled to the thermal conductor layer 42, the heating device 66 may cause heat to evenly reach the scintillator crystal 36 to prevent cracking or breaking A temperature sensor 72, if not integrated into the heating device 66, may measure the surface temperature of the scintillator crystal 36. A control circuit associated with the heating device 66, or the data processing circuitry 14, may control when the heating device 66 is active based on temperatures detected by the temperature sensor 72.

Figure 12:
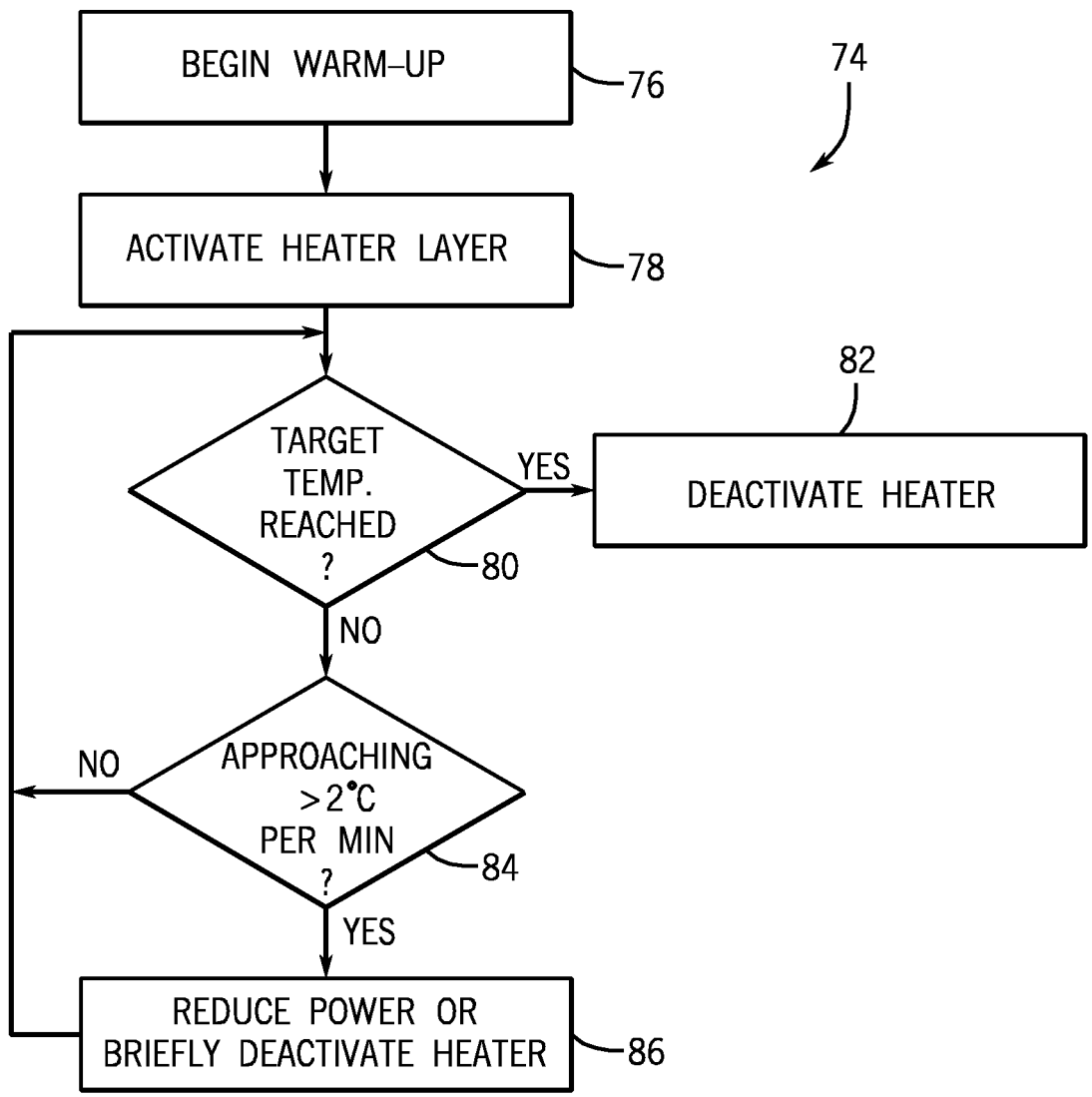
FIG. 12 is a flowchart describing an embodiment of a method for performing a warm-up procedure using the thermally-protected scintillation detector of FIG. 11.

FIG. 12 is a flowchart 74 describing an embodiment of a method for performing a warm-up procedure using the heating device 66, which may slowly heat the scintillator crystal 36 prior to its introduction to a high-temperature environment, such as a subterranean well. The method provided by flowchart 74 of FIG. 12 may be implemented by control circuitry included in the heating device 66 or by the data processing circuitry 14. In a first step 76, the control circuitry may begin the warm-up procedure because the scintillation detector 22 is to be placed in a high-temperature environment. In step 78, the heating device 66 may be activated, causing the scintillator crystal 66 to be heated.

As indicated by decision block 80, if the temperature of the scintillator crystal 86 has reached a target temperature (e.g., the expected temperature of a downhole formation), the heating device 66 may be deactivated in step 82. The scintillator detector 22 may thereafter enter the high-temperature environment without experiencing a rapid increase in the scintillator crystal 36 temperature, which may cause the scintillator crystal 36 to become damaged. If the target temperature has not been reached, the process may flow to decision block 84.

In decision block 84, the control circuitry may consider whether the temperature increase has approached and/or exceeded a threshold rate of change. The particular threshold rate of change may vary depending on the characteristics of the scintillator crystal 36. By way of example, if the scintillator crystal 36 is formed of $LaBr_3$, the designated maximum rate of temperature change may be 2° C. per minute. If the rate of temperature increase does not exceed the threshold rate of change, the heating device 66 may continue to heat the scintillator crystal 36 until the target temperature is reached, as shown in decision block 80, or until the rate of change approaches the threshold, as shown in decision block 84. On the other hand, if the rate of temperature change does approach the threshold rate of change, the amount of power supplied to the heating device 66 may be decreased and/or the heating device 66 may be briefly deactivated, in step 86. When the heating device 66 becomes active again, the process may continue until the scintillator crystal 36 reaches the target temperature.

Figure 13:
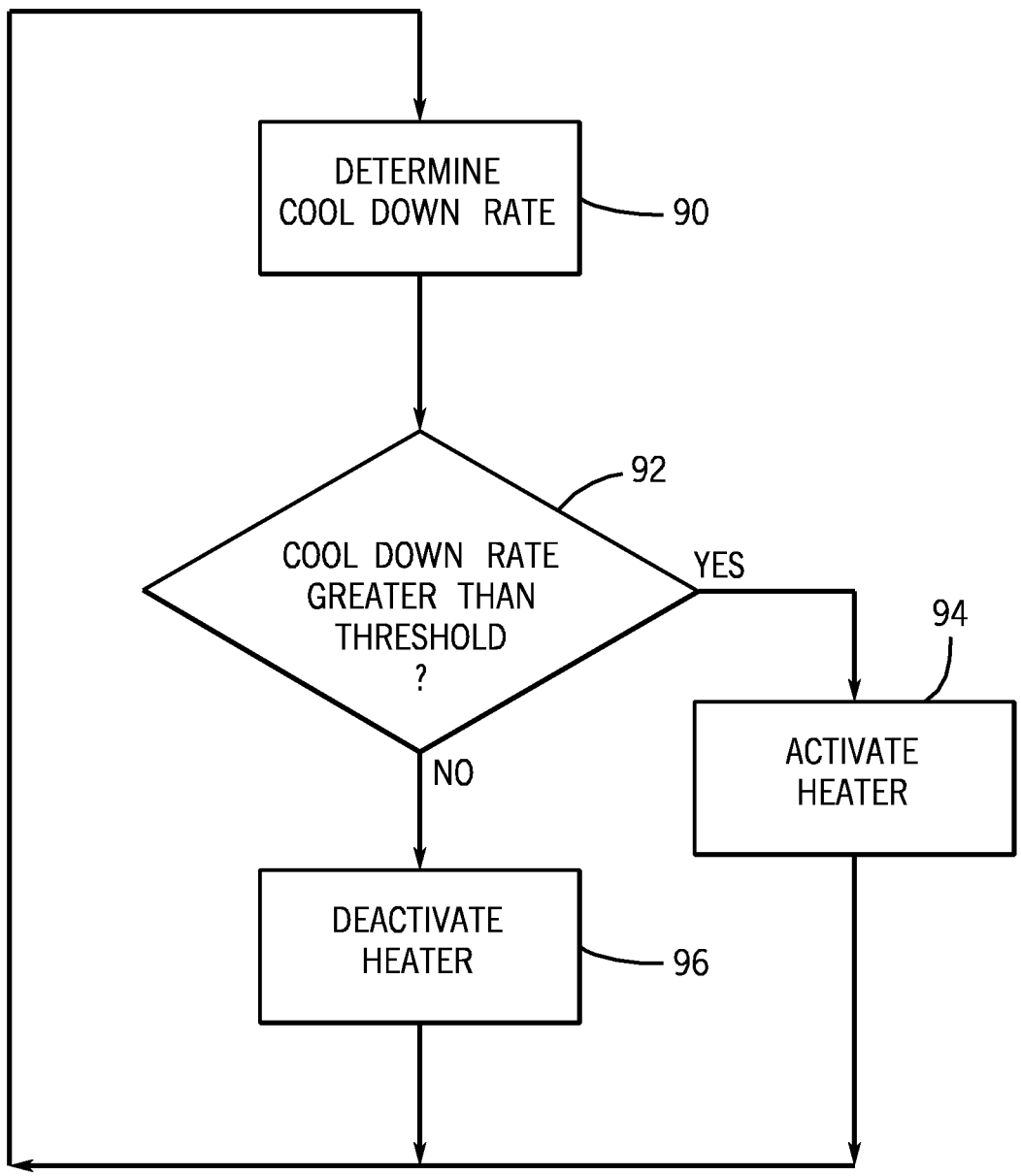
FIG. 13 is a flow chart describing an embodiment of a method for performing a cool-down procedure using the thermally-protected scintillation detector of FIG. 11.

FIG. 13 describes an embodiment of a method for regulating a cool-down of the scintillation detector 22 using the heating device 66, which may ensure that the scintillator crystal 36 does not too rapidly cool after exiting a high-temperature environment, such as a subterranean well. The method provided by the flowchart 88 of FIG. 13 may be implemented by control circuitry included in the heating device 66 or by the data processing circuitry 14. The control circuitry may continuously monitor the cool down rate in step 90 by comparing the current temperature with previous temperatures. In decision block 92, the control circuitry may check the cool down rate to see if it exceeds a threshold rate of change. If so, the heater 66 may be briefly activated in step 94. This activation may continue until the cool down rate falls below the threshold and the heater is deactivated in step 96.

As noted above, the particular threshold rate of change may vary depending on the characteristics of the scintillator crystal 36. By way of example, if the scintillator crystal 36 is formed of $LaBr_3$, the designated maximum rate of temperature change may be 2° C. per minute for a crystal with a diameter of about 2.5 in and a length of 3 in. The maximum allowable rate of change is a function of crystal size, and may be calculated through modeling techniques. Also, the amount of heat provided by the heating device 66 may be calibrated to be sufficient to prevent the scintillator crystal 36 from cooling too rapidly, while still permitting the temperature of the scintillator crystal 36 to continue to drop.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A scintillator comprising:
a scintillator crystal;
a photomultiplier optically coupled to the scintillator crystal; and
a package at least partially surrounding the scintillator crystal, the package comprising a partially open Dewar flask that is open to optically expose a face of the scintillator crystal to the photomultiplier, wherein the partially open Dewar flask extends to cover at least part of the photomultiplier, and wherein the partially open Dewar flask is configured to prevent the scintillator crystal from experiencing a rate of change in temperature sufficient to cause cracking or non-uniform light output, or a combination thereof, and wherein the photomultiplier is at least partly outside of the partially open Dewar flask.

2. The scintillator of claim 1, wherein the partially open Dewar flask comprises an open aperture wider than a width of the scintillator crystal.

3. The scintillator of claim 1, wherein a light-transmissive window optically interposes the scintillator crystal and the photomultiplier within the partially open Dewar flask.

4. The scintillator of claim 1, comprising an active thermal protection element configured to actively prevent the scintillator crystal from experiencing the rate of change in temperature sufficient to cause cracking or non-uniform light output, or the combination thereof.

5. The scintillator of claim 4, wherein the active thermal protection element comprises a heating element configured to control a rate of temperature change in the scintillator crystal.

6. The scintillator of claim 1, wherein the rate of change in temperature is less than 2° C. per minute.

7. The scintillator of claim 1 comprising a layer of thermally conductive metal contacting the scintillator crystal and the partially open Dewar flask.

8. A downhole tool for detecting radiation in a well comprising:
a scintillation detector comprising a scintillator crystal and a photomultiplier optically coupled to the scintillator crystal, wherein the scintillator crystal is at least partially surrounded by a partially open Dewar flask that is open to optically expose a face of the scintillator crystal to the photomultiplier, wherein the partially open Dewar flask extends to cover at least a portion of the photomultiplier and is configured to prevent the scintillator crystal from experiencing a rate of change in temperature sufficient to cause cracking or non-uniform light output, or a combination thereof, and wherein the photomultiplier is at least partly outside of the partially open Dewar flask.

9. The downhole tool of claim 8, wherein the scintillator crystal comprises $LaBr_3$:Ce; $LaCl_3$:Ce; or a La-halide; or any combination thereof.

10. The downhole tool of claim 8, wherein the scintillator crystal is non-hygroscopic.

11. The downhole tool of claim 8, wherein the scintillator crystal comprises LuAP:Ce; LuYAP:Ce:YAP:Ce; LuAG:Pr; or $Lu_2Si_2O_7$; or any combination thereof.

12. A scintillator comprising:
a scintillator crystal;
a photomultiplier optically coupled to the scintillator crystal; and
a package at least partially surrounding the scintillator crystal, the package comprising a partially open Dewar flask that is open to optically expose a face of the scintillator crystal to the photomultiplier, wherein the partially open Dewar flask extends to cover at least part of the photomultiplier, and wherein the partially open Dewar flask is configured to prevent the scintillator crystal from experiencing a rate of change in temperature sufficient to cause cracking or non-uniform light output, or a combination thereof, and wherein:
the photomultiplier is at least partly outside of the partially open Dewar flask;
the partially open Dewar flask comprises an open aperture wider than a width of the scintillator crystal;
the rate of change in temperature is less than 2° C. per minute; and
the scintillator further comprises:
a light-transmissive window optically interposing the scintillator crystal and the photomultiplier within the partially open Dewar flask; and
an active thermal element configured to actively prevent the scintillator crystal from experiencing the rate of change in temperature sufficient to cause cracking or non-uniform light output, or the combination thereof, wherein the active thermal protection element comprises a heating element configured to control a rate of temperature change in the scintillator crystal.

* * * * *